United States Patent
Yamazaki et al.

(10) Patent No.: US 6,831,036 B1
(45) Date of Patent: Dec. 14, 2004

(54) CO-CATALYST FOR PURIFYING EXHAUST GAS

(75) Inventors: Masatoshi Yamazaki, Saitama (JP); Yuichi Anno, Saitama (JP); Kiyoshi Shinoda, Saitama (JP); Isamu Yashima, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 113 days.

(21) Appl. No.: 09/831,450

(22) PCT Filed: Sep. 11, 2000

(86) PCT No.: PCT/JP00/06190

§ 371 (c)(1),
(2), (4) Date: May 10, 2001

(87) PCT Pub. No.: WO01/19510

PCT Pub. Date: Mar. 22, 2001

(30) Foreign Application Priority Data

Sep. 10, 1999 (JP) .............................................. 11-257863

(51) Int. Cl.[7] .......................... B01J 23/42; B01J 23/58; B01J 23/56; B01J 23/44; B01J 23/00

(52) U.S. Cl. ........................ 502/327; 502/302; 502/303; 502/304; 502/328; 502/332; 502/333; 502/334; 502/339; 502/349; 502/355; 502/415; 502/439

(58) Field of Search ................................ 502/302, 303, 502/304, 327, 328, 332, 333, 334, 339, 349, 355, 415, 439

(56) References Cited

U.S. PATENT DOCUMENTS

| | | | | |
|---|---|---|---|---|
| 4,714,694 A | * | 12/1987 | Wan et al. ................... 502/304 |
| 4,738,947 A | * | 4/1988 | Wan et al. ................... 502/304 |
| 4,868,150 A | * | 9/1989 | Spooner et al. ............. 502/439 |
| 4,919,902 A | * | 4/1990 | Bricker et al. ............ 423/213.5 |
| 4,927,799 A | * | 5/1990 | Matsumoto et al. ........ 502/303 |
| 5,015,617 A | * | 5/1991 | Ohata et al. ................. 502/304 |
| 5,019,546 A | * | 5/1991 | Murakami et al. .......... 502/303 |
| 5,075,276 A | * | 12/1991 | Ozawa et al. ................ 502/304 |
| 5,318,757 A | * | 6/1994 | Abe et al. .................... 422/174 |
| 5,352,646 A | * | 10/1994 | Blanchard et al. .......... 502/263 |
| 5,462,907 A | * | 10/1995 | Farrauto et al. ............. 502/304 |
| 5,496,788 A | * | 3/1996 | Domesle et al. ............. 502/333 |
| 5,532,198 A | * | 7/1996 | Chopin et al. .............. 502/304 |
| 5,597,771 A | * | 1/1997 | Hu et al. ..................... 502/304 |
| 5,607,892 A | * | 3/1997 | Chopin et al. .............. 502/304 |
| 5,626,826 A | * | 5/1997 | Chopin et al. ........... 423/213.2 |
| 5,693,299 A | * | 12/1997 | Chopin et al. ........... 423/213.2 |
| 5,712,218 A | * | 1/1998 | Chopin et al. .............. 502/304 |
| 5,741,467 A | * | 4/1998 | Williamson et al. ..... 423/213.5 |
| 5,883,037 A | * | 3/1999 | Chopin et al. .............. 502/308 |
| 5,888,464 A | * | 3/1999 | Wu et al. ................. 423/213.5 |
| 5,908,800 A | * | 6/1999 | Bonneau et al. ............. 501/103 |
| 5,919,727 A | * | 7/1999 | Brezny ........................ 502/304 |
| 5,945,369 A | * | 8/1999 | Kimura et al. .............. 502/304 |
| 5,958,829 A | * | 9/1999 | Domesle et al. ............. 502/333 |
| 5,981,427 A | * | 11/1999 | Sung et al. .................. 502/325 |
| 6,040,265 A | * | 3/2000 | Nunan ......................... 502/242 |
| 6,051,529 A | * | 4/2000 | Brezny ........................ 502/302 |

(List continued on next page.)

Primary Examiner—Cam N. Nguyen
(74) Attorney, Agent, or Firm—Sughrue Mion, PLLC (57) ABSTRACT

A co-catalyst for purifying an exhaust gas which can be used for a loner period of time as an actual catalyst by using the cerium oxide in the conventional co-catalyst for purifying the exhaust gas as a cerium-containing complex oxide for elevating the resistance to heat and suppressing the performance reduction due to thermal deterioration and by making a specific surface area and an oxygen storage capacity over specified values. A co-catalyst for purifying an exhaust gas of the present invention includes a composite oxide including (a) cerium; and (b) at least one element selected from the group consisting of zirconium, yttrium, strontium, barium and a rare-earth element supported on a particulate aluminum oxide support; a specific surface area of the co-catalyst after sintering being not less than 40 m2/g; an oxygen storage capacity at 400° C. being not less than 10 μmols/g and an oxygen storage capacity at 700° C. being not less than 100 μmols/g.

3 Claims, 2 Drawing Sheets

U.S. PATENT DOCUMENTS

| | | | | |
|---|---|---|---|---|
| 6,069,111 A | * | 5/2000 | Yamamoto et al. | 502/333 |
| 6,107,239 A | * | 8/2000 | Qin et al. | 502/300 |
| 6,107,240 A | * | 8/2000 | Wu et al. | 502/304 |
| 6,139,814 A | * | 10/2000 | Shigapov et al. | 423/592.1 |
| 6,150,288 A | * | 11/2000 | Suzuki et al. | 501/105 |
| 6,153,160 A | * | 11/2000 | Voss et al. | 423/213.7 |
| 6,165,935 A | * | 12/2000 | Williamson et al. | 502/339 |
| 6,171,572 B1 | * | 1/2001 | Aozasa | 423/594.12 |
| 6,180,075 B1 | * | 1/2001 | Lindner et al. | 423/213.2 |
| 6,214,306 B1 | * | 4/2001 | Aubert et al. | 423/213.2 |
| 6,294,140 B1 | * | 9/2001 | Mussmann et al. | 423/213.5 |
| 6,306,794 B1 | * | 10/2001 | Suzuki et al. | 502/304 |
| 6,464,946 B1 | * | 10/2002 | Yamada et al. | 422/177 |

* cited by examiner

CO-CATALYST FOR PURIFYING EXHAUST GAS

TECHNICAL FIELD

The present invention relates to a co-catalyst for purifying an exhaust gas of an internal combustion engine, more particularly to the co-catalyst for efficiently converting the exhaust gas containing an environmental polluting substance such as carbon monoxide, hydrocarbons and nitrogen oxides into a nontoxic substance by means of oxidation and/or reduction.

BACKGROUND ART

A catalyst prepared by finely dispersing a precious metal such as platinum, rhodium and palladium on a support such as alumina having a larger specific surface area is employed for purifying an exhaust gas discharged from an internal combustion engine of an automobile. These precious metals have a role of converting the nitrogen oxides into nitrogen in addition to a role of converting the hydrocarbons and the carbon monoxide in the exhaust gas into carbon dioxide and water and into carbon dioxide, respectively, by oxidation. A simultaneous catalysis on both of the oxidation reaction and the reduction reaction enables simultaneous removal of the three components including the hydrocarbons, the carbon monoxide and the nitrogen oxides. It is required to maintain a ratio between fuel and air (air-fuel ratio) at constant (at a theoretical air-fuel ratio) for efficiently affecting the simultaneous catalysis on the both reactions.

However, the number of rotations of the internal combustion engine of the automobile is likely to be changed instantaneously, and the air-fuel ratio largely changes depending on driving situation such as speed-acceleration, speed-reduction, lower-speed driving and higher-speed driving. Accordingly, an amount of fuel supplied to an engine is controlled to make the air-fuel ratio constant by judging the change of an oxygen concentration in the exhaust gas by using an oxygen sensor.

The precious metal catalyst is employed with a co-catalyst for a purpose of preventing the reduction of the purifying catalysis generated due to the change of the air-fuel ratio by the chemical function of the catalyst itself. An example of the co-catalyst includes cerium oxide. The cerium oxide has a characteristic of eliminating and absorbing adhered oxygen and lattice oxygen in the cerium oxide depending on the degree of the oxygen partial pressure. Accordingly, when the exhaust gas is reductive, the cerium oxide eliminates the oxygen [$CeO_2 \rightarrow CeO_{2-x} + (x/2)O_2$] to supply the oxygen into the exhaust gas for affecting the oxidation reaction. On the other hand, when the exhaust gas is oxidative, the cerium oxide taking the oxygen into its oxygen defects [$CeO_{2-x} + (x/2)O_2 \rightarrow CeO_2$] to decrease the oxygen concentration in the exhaust gas for affecting the reduction reaction. In this manner, the cerium oxide acts as a buffering agent for decreasing the change of the oxidative property and the reductive property of the exhaust gas to maintain the purifying property of the catalyst.

However, the co-catalyst for purifying the exhaust gas is likely to be deteriorated because of the long-time exposure to a higher-temperature gas from the internal combustion engine. Especially, the resistance to heat of the cerium oxide is low, and the cerium oxide is sintered to reduce its specific surface area upon exposure to a higher-temperature gas, thereby resulting in the reduction of the initial properties as the co-catalyst. Accordingly, the elevation of the thermal stability by the addition of other elements such as zirconium or of the stability of the hexagonal by increasing the lattice constant by means of the addition of other elements is attempted. However, the satisfactory results have not jet been obtained.

Although the cerium oxide is mixed with aluminum oxide (α-type, γ-type, θ-type) to prepare a co-catalyst in accordance with a widely-employed technology and the sintering of the mixture can be physically prevented by the mixing of the aluminum oxide in this case, the sintering of the cerium oxide itself cannot be prevented.

Even if the sintering of the cerium oxide could be prevented, the actively is lowered in a relatively short period of time not to obtain a substantially longer lifetime when the co-catalyst is continuously used with the precious metal catalyst in an actual internal combustion engine for purifying an exhaust gas.

An object of the present invention is to provide a co-catalyst for purifying an exhaust gas which can be used for a loner period of time as an actual catalyst and a process for treating an exhaust gas catalyst by using the cerium oxide in the conventional co-catalyst for purifying the exhaust gas as a cerium-containing complex oxide for elevating the resistance to heat and suppressing the performance reduction due to thermal deterioration and by making a specific surface area and an oxygen storage capacity over specified values.

DISCLOSURE OF INVENTION

The present invention is a co-catalyst for purifying an exhaust gas including; a composite oxide including (a) cerium; and (b) at least one element selected from the group consisting of zirconium, yttrium, strontium, barium and a rare-earth element supported on a particulate aluminum oxide support; a specific surface area of the co-catalyst after sintering being not less than 40 $m^2/g$; an oxygen storage capacity at 700° C. being not less than 100 $\mu$mols/g or an oxygen storage capacity at 400° C. being not less than 10 $\mu$mols/g.

The present invention will be described in detail.

As described above, the sintering of the cerium oxide itself cannot be prevented even if the co-catalyst is formed by mixing the cerium oxide and the aluminum oxide. However, the repeated experiments by the present inventors revealed that a co-catalyst containing a cerium-based composite oxide having a higher stability to heat and an anti-sintering property prepared by supporting a composite oxide containing cerium, a specified element and oxygen on the particulate aluminum oxide. The co-catalyst can be prepared, for example, by reacting an aqueous solution dissolving therein a water-soluble salt of cerium and another water-soluble salt of a specified element in contact with the particulate aluminum oxide, with a specified precipitating agent (reducing agent) to deposit the reaction product on the particulate aluminum oxide and sintering the particulate aluminum oxide having the deposited reaction product thereon to support the composite oxide containing the cerium, the specified element and the oxygen on the particulate aluminum oxide.

It has been known that the use of the co-catalyst having the specific surface area and the specified oxygen storage capacity among those having the above particulate aluminum. oxide supporting the composite oxide can elevate the catalysis and increase the treating efficiency of the actual exhaust gas.

After vigorous experiments for elevating the catalysis, the present inventors have conceived based on the above knowledge that the co-catalyst can be prevented from the reduction of the initial activity even after exposure to a higher temperature for a longer period of time to maintain the higher catalysis by supporting the cerium-based composite oxide containing the cerium oxide and an oxide of another metal on the particulate aluminum oxide and by adjusting the specific surface area thereof after higher-temperature sintering to be 40 m$^2$/g or more, and the oxygen storage capacities at 700° C. and 400° C. to be 100 $\mu$mols/g and 10 $\mu$mols/g, respectively, thereby reaching to the present invention.

A composition ratio between the aluminum oxide and the composite oxide, and a composition ratio between the cerium and the added element in the composite oxide are not especially restricted. However, the reduction of a relative amount of the cerium in the co-catalyst tends to decrease the effect of the co-catalyst. When, inversely, the relative amount of the cerium is excess, the cerium oxide separately exists in addition to the composite oxide containing the cerium or all the cerium oxide cannot be supported on the aluminum oxide. Accordingly, the excessive relative amount of the cerium does not produce the effect corresponding thereto. The composition ratio between the aluminum oxide and the composite oxide is preferably about (1:0.5) to (1:4) by weight. The composition ratio between the cerium and the added element in the composite oxide when calculated into the corresponding oxides is preferably about (1:0.1) to (0.1:1), and more preferably about (1:0.2) to (0.2:1).

The aluminum oxide employed in the present invention is desirably particulate, and has the larger specific surface area and the higher stability to heat.

Examples of such aluminum oxide include α-alumina, θ-alumina and γ-alumina, and a foreign element (for example, an alkaline earth metal and silica) may be added to the alumina. However, boehmite which is included in the alumina is excluded form the alumina of the present invention because the specific surface area thereof is small and the resistance to heat is inferior.

Although the particle size of the particulate aluminum oxide is not especially restricted, the average particle size is preferably 10 $\mu$m where the particulate aluminum oxide even supporting the composite oxide on the surface is hardly agglomerated and the higher dispersing ability can be maintained. When, however, the average particle size is excessive, the specific surface area is is reduced below 40 m$^2$/g required in the co-catalyst of the present invention so that the particle size is properly determined considering the above.

The added element for forming the composite oxide of the present invention together with the cerium is at least one element selected from the group consisting of zirconium, yttrium, strontium, barium and a rare-earth element (for example, lanthanum, praseodymium, neodymium and ytterbium). The co-catalyst may be prepared by any process, and usually prepared by mixing and reacting an aqueous solution dissolving a water-soluble salt of the cerium and a water-soluble salt of the added element with a dispersion of the aluminum oxide and a reducing agent such as aluminum bicarbonate or its aqueous solution. Such a dispersion may be prepared, for example, by dissolving the water-soluble salts of the cerium and of at least one of the added elements into water and dispersing the particulate aluminum oxide thereto or by adding water to the mixture of the water-soluble salts of the cerium and of at least one of the added elements and the particulate aluminum oxide.

Although the water-soluble salt is not especially restricted, a nitrate is preferably employed for suppressing the influence caused by an impurity anion.

After the internal pores of the particulate aluminum oxide are sufficiently impregnated with the aqueous solution, the dispersion is reacted with, for example, ammonium bicarbonate or its aqueous solution functioning as a precipitating agent and a reducing agent. The mixing method includes the addition of the dispersion to the ammonium bicarbonate aqueous solution and the addition of the ammonium bicarbonate aqueous solution to the dispersion. In case of the solid ammonium bicarbonate, it may be added to and dissolved in the dispersion.

In addition to the method, another method may be employed which includes adhering the aqueous solution of the water-soluble salts of the cerium and the added element on the particulate aluminum oxide and contacting the aluminum oxide with the aqueous solution of the reducing agent for occurring the reaction.

The particulate aluminum oxide having the adhered aqueous solution can be prepared by dispersing the particulate aluminum oxide in the aqueous solution, sufficiently entering the aqueous solution into the internal pores of the particulate aluminum oxide and taking out the particulate aluminum oxide for separation by means of filtration or the like, or by placing the particulate aluminum oxide on a filtrating medium and flowing down the above aqueous solution onto the particulate aluminum oxide.

In this method, most parts of the reaction product among the cerium, the added element and the reducing agent are adhered on the particulate aluminum oxide, however, an amount of the aqueous solution which can be adhered is disadvantageously reduced. The disadvantage can be removed to some degree by increase of the concentration of the cerium and the added element in the aqueous solution and repetition of the flow-down of the aqueous solution.

The reaction product containing the cerium and the added element is deposited on the particulate aluminum oxide by any of the above-mentioned reactions. The reaction product may be a double salt, the composite oxide or the mixture thereof depending on reaction conditions. When, for example, the dispersion is added to the aqueous solution containing the reducing agent, the composite oxide is likely produced, and when the aqueous solution containing the reducing agent is inversely added to the dispersion, the double salt is likely produced.

Although the reaction temperature is not especially restricted, it has been known that the reaction product having the higher resistance to heat was obtained by the reaction under heating rather than at room temperature.

After the particulate aluminum oxide having the reaction product obtained in this manner and deposited thereon is separated by filtration or the like and washed, the particulate aluminum oxide is sintered. When the reaction product is the double salt, water and the carbonate therein are decomposed by the sintering to produce the composite oxide which is deposited on the particulate aluminum oxide. When the reaction product is the composite oxide, it is supported on the particulate aluminum oxide as it is by the sintering, thereby providing the co-catalyst.

Since the cerium is firmly supported on the particulate aluminum oxide in the form of the composite oxide different from conventional mixed power containing cerium oxide and aluminum oxide, the resistance to heat of the co-catalyst is elevated and the sintering is prevented even if the co-catalyst is exposed to a higher temperature for a longer period of time and the performance reduction due to thermal deterioration can be significantly suppressed. The coating of the particulate aluminum oxide on the composite oxide increases the contact rate with an exhaust gas.

The sintering temperature during the manufacture of the co-catalyst is not especially restricted and an ordinary sintering temperature is between 500 and 800° C. In the present invention, the sintering is preferably conducted between 800 and 1100° C. This is because the catalyst for purifying the exhaust gas of the internal combustion engine containing the co-catalyst actually mounted in the internal combustion engine such as an automobile is frequently exposed to a temperature exceeding 1000° C. at maximum depending on the traveling speed of the automobile so that the higher-temperature sintering is desirable to further increasing the resistance to heat. Since, however, the co-catalyst is not the composite oxide as mentioned above in the conventional catalyst for purifying the exhaust gas of the internal combustion engine, the higher-temperature sintering of the conventional catalyst results in the deterioration of the cerium oxide which disables the smooth transfer of the oxygen, thereby inactivating the whole catalyst.

In contrast, the existence of the cerium in the form of the composite oxide together with the added element in the co-catalyst in the present invention significantly elevates the resistance to heat, and the activity reduction by the sintering at about 100° C. is substantially negligible.

The higher-temperature sintering can hardly prevent from the reduction of the specific surface areas of the whole catalyst and the co-catalyst. The function of the added element is to secure the oxygen-absorbing and releasing abilities (oxygen storage capacity) of the cerium by forming the composite oxide. The oxygen storage capacity of the cerium generally increasing with a temperature may be decreased due to the severe sintering. Accordingly, the present invention intends not to deteriorate the complementary function for the oxidation-reduction reaction which is an essential function of the co-catalyst by maintaining the specific surface area and the oxygen storage capacity which directly affect the catalysis to be specified values or more while securing the elevation of the resistance to heat of the catalyst by the higher-temperature sintering.

As described above, the specific surface area of the co-catalyst of the present invention is adjusted to be 40 $m^2/g$ or more. The specific surface area decreases with the increase of the sintering temperature, and largely depends on the specific surface area of the particulate aluminum oxide employed rather than the sintering temperature. Accordingly, if the specific surface area of the co-catalyst after the sintering is expected to be less than 40 $m^2/g$ considering the required sintering conditions, the specific surface area of the co-catalyst is desirably adjusted to be 40 $m^2/g$ or more by employing the aluminum oxide having a smaller particle size.

Although the oxygen storage capacity of the cerium oxide is largely reduced when the cerium oxide is singly sintered at a higher-temperature, such a reduction seldom occurs when the cerium oxide forms the composite oxide as in the present invention. Although the oxygen storage capacity has a higher-temperature dependency, the functions of the co-catalyst are sufficiently displayed when the oxygen storage capacity at the practical temperature of the catalyst used as the co-catalyst for purifying the exhaust gas of the internal combustion engine is 10 $\mu$mols/g or more.

In case of the co-catalyst containing the composite oxide of the cerium and the added element in accordance with the present invention, the oxygen storage capacity remarkably changes between 600 and 700° C., and exceeds 1000 $\mu$mols/g at 700° C. Accordingly, the intrinsic oxygen storage capacity of the cerium is highly maintained by treating the exhaust gas at 700° C. or more with the catalyst for purifying the exhaust gas of the internal combustion engine of the present invention, and further the functions required for the catalyst for purifying the exhaust gas of the internal combustion engine such as oxidation of carbon monoxide, oxidation of hydrocarbons and reduction of nitrogen oxides can be secured to promote the production of the harmless exhaust gas. Further, the functions of the co-catalyst are sufficiently displayed at 400° C. which is in a lower-temperature range than 700° C. when the composite oxide is formed and the above specific surface value is maintained.

BEST MODE FOR IMPLEMENTING INVENTION

Although Examples of a process of preparing a co-catalyst for purifying an exhaust gas in accordance with the present invention will be described, the present invention shall not be deemed to be restricted thereto.

EXAMPLE 1

After cerium nitrate (50 g when converted into $CeO_2$) and zirconium nitrate (50 g when converted into $ZrO_2$) were dissolved into water of which a total amount was 3 liters, 50 g of $\gamma$-alumina (specific surface area: 150 $m^2/g$, average particle size: 18 $\mu$m) was put into 3 liters of the aqueous solution and was sufficiently dispersed and mixed. The dispersion was added dropwise to 3 liters of an aqueous solution dissolving 150 g of ammonium bicarbonate under stirring for reaction. The reaction provided the alumina coated with the reaction product containing the cerium and the zirconium.

After the sufficient washing of the product followed by the filtration, the product was dried at 100° C. and further sintered at 600° C. for three hours to provide the alumina powder supporting the composite oxide containing the cerium and the zirconium.

The composition rate of the alumina supporting the composite oxide (weight ratio converted into corresponding oxides), the average particle size and the specific surface area (listed in the column before the higher-temperature treatment), and the specific surface area of the alumina powder after the higher-temperature treatment at 1000° C. for three hours in an ambient atmosphere (listed in the column after the higher-temperature treatment) were shown in Table 1. The specific surface area of the alumina powder after the sintering at 600° C. was 90 $m^2/g$ and was reduced to 48 $m^2/g$ after the sintering at 1000° C. which was, however, a satisfactory surface area significantly larger than 40 $m^2/g$.

After the alumina powder supporting the composite oxide obtained by the sintering at 600° C. for three hours, the $\gamma$-alumina (specific surface area 150 $m^2/g$, average particle size: 18 μm) and boehmite binder were weighed such that the weight ratio thereof was 5:5:1, these were sufficiently mixed in a ball mill. Water was added to the mixture for preparing a slurry.

After the slurry was supported on a honey-comb support made of cordierite (diameter: 76 mm, length: 100 mm, and 300 cells/square inch) at 160 g/liter and sintered at 500° C., the support was impregnated with a precious metal solution containing 0.375 g of palladium and 0.075 g of rhodium for adhering and supporting all the precious metals. After the re-sintering at 500° C., the reduction was conducted by using a reducing agent to prepare the precious metal-supported catalyst containing the co-catalyst.

The catalyst was thermally deteriorated by means of a higher-temperature treatment at 1000° C. for 20 hours in an ambient atmosphere. The catalyst after the thermal deterioration was mounted on an automobile, and total discharge amounts (values expressed in grams of carbon monoxide, nitrogen oxides and hydrocarbons per 1 km of a traveling distance of the automobile) of polluted substances in an exhaust gas were measured in accordance with 10 to 15 modes. The results were shown in Table 2. After the catalyst supporting layer after the thermal deterioration was peeled off and the X-ray diffraction was conducted thereon, a single peak was observed which was identified to be $Ce_{0.5}Zr_{0.5}O_2$.

Comparative Example 1

After the γ-alumina (specific surface area: 150 m²/g, average particle size: 18 μm), the cerium oxide, the zirconium oxide and the boehmite binder were weighed at a weight of 3:3:3:1, these were sufficiently mixed in a ball mill. Water was added to the mixture for preparing a slurry.

A precious metal catalyst containing a co-catalyst was prepared by using the slurry similarly to Example 1, and total discharge amounts of polluted substances in an exhaust gas were measured similarly to Example 1 by using the precious metal catalyst. The results were shown in Table 2. After the catalyst supporting layer after the thermal deterioration was peeled off and the X-ray diffraction was conducted thereon, two peaks of $CeO_2$ and $ZrO_2$ were separately observed.

As apparent from the data shown in Table 2, the comparison between the exhaust gas treatment by the catalyst of Example 1 and the exhaust gas treatment by the catalyst of Comparative Example 1 revealed that the polluted substances was reduced to about half by using the catalyst having the cerium-containing composite oxide as the co-catalyst of Example 1 because the carbon monoxide concentration in the exhaust gas treated by the former catalyst was 50.0% of that treated by the latter catalyst, the nitrogen oxide concentration treated by the former catalyst was 69.2% of that treated by the latter catalyst and the hydrocarbon concentration treated by the former catalyst was 42.5% of that treated by the latter catalyst.

Comparative Example 2

After cerium nitrate (50 g when converted into $CeO_2$) and zirconium nitrate (50 g when converted into $ZrO_2$) were dissolved into water of which a total amount was 3 liters, 59 g of boehmite (average particle size: 6 μm) in place of the γ-alumina employed in Example 1 was put into 3 liters of the aqueous solution and was sufficiently dispersed and mixed. The dispersion was added dropwise to 3 liters of an aqueous solution dissolving 150 g of ammonium bicarbonate under stirring for reaction. The reaction provided the boehmite coated with the reaction product containing the cerium and the zirconium. After the sufficient washing of the product followed by the filtration, the product was dried at 100° C. and further sintered at 600° C. for three hours to provide the powder.

The composition rate of the powder (weight ratio converted into corresponding oxides), the average particle size and the specific surface area (listed in the column before the higher-temperature treatment), and the specific surface area of the powder after the high-temperature treatment at 1000° C. for three hours in an ambient atmosphere (listed in the column after the high-temperature treatment) were shown in Table 1.

A precious metal catalyst containing a co-catalyst was prepared by using the slurry similarly to Example 1, and total discharge amounts of polluted substances in an exhaust gas were measured similarly to Example 1 by using the precious metal catalyst. The results were shown in Table 2.

The comparison between the exhaust gas treatment by the catalyst of Example 1 and the exhaust gas treatment by the catalyst of Comparative Example 2 revealed that the polluted substances were significantly reduced because the carbon monoxide concentration in Example 1 was 53.2% of that of Comparative Example 2, the nitrogen oxide concentration was 66.1% of that of Comparative Example 2 and the hydrocarbon concentration was 55.4% of Comparative Example 2.

Comparative Example 3

Powder was prepared in accordance with the same conditions as those of Comparative Example 2 except that 1.5 liters of an ammonia aqueous solution (ammonia water=1:9) was used in place of the aqueous solution dissolving the ammonium bicarbonate and a dispersion was added dropwise to the ammonia aqueous solution, and a composition rate, an average particle size and a specific surface area were measured similarly to Comparative Example 2. The results were shown in Table 1.

Total discharge amounts of polluted substances in an exhaust gas were measured similarly to Comparative Example 2. The results were shown in Table 2.

The comparison between the exhaust gas treatment by the catalyst of Example 1 and the exhaust gas treatment by the catalyst of Comparative Example 3 revealed that the polluted substances were significantly reduced by using the catalyst of Example 1 because the carbon monoxide concentration in Example 1 was 66.6% of that of Comparative Example 3, the nitrogen oxide concentration was 71.4% of that of Comparative Example 3 and the hydrocarbon concentration was 66.2% of Comparative Example 3 though the reduction rates were smaller than those of Comparative Examples 1 and 2.

TABLE 1

| | Composition Ratio (Weight Ratio) $Al_2O_3$:$CeO_2$:$ZrO_2$ | Average Particle Size (μm) | Specific Surface Area of Powder (m²/g) | |
|---|---|---|---|---|
| | | | Before High Temperature Treatment | After High Temperature Treatment |
| Example 1 | 1.00:0.91:0.95 | 22 | 90 | 48 |
| Example 2 | 1.00:1.12:0.24 ($AlaO_3$:$CeO_2$:$Le_2O_3$) | 25 | 86 | 42 |
| Example 3 | 1.00:0.91:0.95 | 18 | 145 | 105 |

TABLE 1-continued

|  | Average Particle Size (μm) | Specific Surface Area of Powder (m²/g) | |
|---|---|---|---|
| Composition Ratio (Weight Ratio) Al₂O₃:CeO₂:ZrO₂ | | Before High Temperature Treatment | After High Temperature Treatment |
| Comp. Ex. 1 | — | — | — | — |
| Comp. Ex. 2 | 1.00:1.08:0.98 | 8 | 88 | 34 |
| Comp. Ex. 3 | 1.00:1.05:1.04 | 8 | 76 | 29 |

EXAMPLE 2

Alumina powder supporting a composite oxide containing cerium and lanthanum was prepared in accordance with the same conditions as those of Example 1 except that lanthanum nitrate (10 g when converted into $La_2O_3$) was used in place of the zirconium nitrate of Example 1. A composition rate, an average particle size and a specific surface area measured similarly to Example 1 were shown in Table 1.

Total discharge amounts of polluted substances in an exhaust gas were measured similarly to Example 1. The results were shown in Table 2.

EXAMPLE 3

After cerium nitrate (50 g when converted into $CeO_2$) and zirconium nitrate (50 g when converted into $ZrO_2$) were dissolved into water of which a total amount was 0.5 liter, 50 g of γ-alumina (specific surface area: 150 m²/g, average particle size: 18 μm) was put into 0.5 liter of the aqueous solution and was sufficiently dispersed and mixed. The dispersion was filtered to recover the powder which was immediately added dropwise to 3 liters of an aqueous solution dissolving 150 g of ammonium bicarbonate under stirring for reaction. The reaction provided the alumina coated with the reaction product containing the cerium and the zirconium.

Alumina powder supporting a composite oxide containing cerium and lanthanum was prepared by a treatment similar to that of Example 1.

A composition rate, an average particle size and a specific surface area measured similarly to Example 1 were shown in Table 1.

TABLE 2

|  | Total Discharge Amount of Polluted Substances (g/km) | | |
|---|---|---|---|
|  | CO | NOx | HC |
| Example 1 | 0.42 | 0.045 | 0.051 |
| Example 2 | 0.46 | 0.050 | 0.077 |
| Example 3 | 0.31 | 0.011 | 0.021 |
| Comp. Ex. 1 | 0.84 | 0.065 | 0.120 |
| Comp. Ex. 2 | 0.79 | 0.068 | 0.092 |
| Comp. Ex. 3 | 0.63 | 0.063 | 0.082 |

Examples 4 to 6 and Comparative Examples 4 to 8

Alumina powders supporting composite oxides were prepared in accordance with the preparation process of Example 2 except that praseodymium nitrate (Example 4), neodymium nitrate (Example 5), yttrium nitrate (Example 6), strontium nitrate (Comparative Example 4), barium nitrate (Comparative Example 5), ytterbium nitrate (Comparative Example 6), vanadium nitrate (Comparative Example 7) or indium nitrate (Comparative Example 8) was used in place of the lanthanum nitrate used in the process of Example 2.

The specific surface areas of these alumina powders after the higher-temperature treatment at 1000° C. for three hours in an ambient atmosphere were measured. The results were shown in Table 3. It was shown in Table 3 that the specific surface areas after the higher-temperature treatment using the praseodymium, the neodymium and the yttrium were 48, 43 and 41 m²/g, respectively, which exceeded 40 m²/g. Although the specific surface areas using the strontium, the barium and ytterbium were 38, 32 and 35 m²/g, respectively, which were below 40 m²/g, these were close to 40 m²/g different from those for the vanadium and the indium. The specific surface areas of the using the strontium, the barium and the ytterbium can be easily adjusted over 40 m²/g by increasing the specific surface areas of the alumina powders, and accordingly these metals are included in the added element used in the present invention depending on conditions.

Examples 7 to 9 and Comparative Example 15

Co-catalysts supporting a composite oxide containing cerium and zirconium were prepared by supporting cerium oxide and zirconium oxide in various element ratios on alumina (γ-alumina or boehmite) acting as a support. The support used herein was the γ-alumina (Examples 7 to 9 and Comparative Examples 9 to 13) or the boehmite (Comparative Examples 14 and 15), the composition ratios of $Al_2O_3$:$CeO_2$:$ZrO_2$ were 1.0:1.0:0.5 (Example 7), 1.0:1.0:0.1 (Example 8), 1.0:1.0:0.1 (Example 9), 1.0:1.0:0.1 (Comparative Example 9), 1.0:1.0:0.1 (Comparative Example 10), 1.0:1.0:0.1 (Comparative Example 11), 1.0:1.0:0.1 (Comparative Example 12), 1.0:1.0:0.1 (Comparative Example 13), 1.0:1.0:0.1 (Comparative Example 14) and 1.0:1.0:0.1 (Comparative Example 15) in this order.

Each of these catalysts was treated at a higher temperature treatment of 1000° C. for three hours in an ambient atmosphere. Composition ratios (weight ratios converted into corresponding oxides) and specific surface areas after the higher temperature treatment of each of the co-catalysts were shown in Table 4.

TABLE 3

|  | Added Element | Specific Surface Area After High Temperature Treatment |
|---|---|---|
| Example 4 | Pr | 48 m²/g |
| Example 5 | Nd | 43 m²/g |
| Example 6 | Y | 41 m²/g |
| Comp. Ex. 4 | Sr | 38 m²/g |
| Comp. Ex. 5 | Ba | 32 m²/g |
| Comp. Ex. 6 | Yb | 35 m²/g |
| Comp. Ex. 7 | V | 12 m²/g |
| Comp. Ex. 8 | In | 16 m²/g |

TABLE 4

|  | Composition Ratio (Weight Ratio) $Al_2O_3:CeO_2:ZrO_2$ | Support | Specific Surface Area After High Temperature Treatment |
|---|---|---|---|
| Example 7 | 1.0:1.0:0.5 | γ-alumina | 43 m²/g |
| Example 8 | 1.0:0.5:0.5 | γ-alumina | 46 m²/g |
| Example 9 | 1.0:0.2:1.0 | γ-alumina | 41 m²/g |
| Comp. Ex. 9 | 1.0:1.0:0.1 | γ-alumina | 38 m²/g |
| Comp. Ex. 10 | 1.0:2.5:1.0 | γ-alumina | 39 m²/g |
| Comp. Ex. 11 | 1.0:3.5:1.0 | γ-alumina | 30 m²/g |
| Comp. Ex. 12 | 1.0:1.0:0.0 | γ-alumina | 18 m²/g |
| Comp. Ex. 13 | 1.0:1.0:0.0 | γ-alumina | 19 m²/g |
| Comp. Ex. 14 | 1.0:1.0:0.1 | Boehmite | 12 m²/g |
| Comp. Ex. 15 | 1.0:2.5:1.0 | Boehmite | 6 m²/g |

Figure 4:
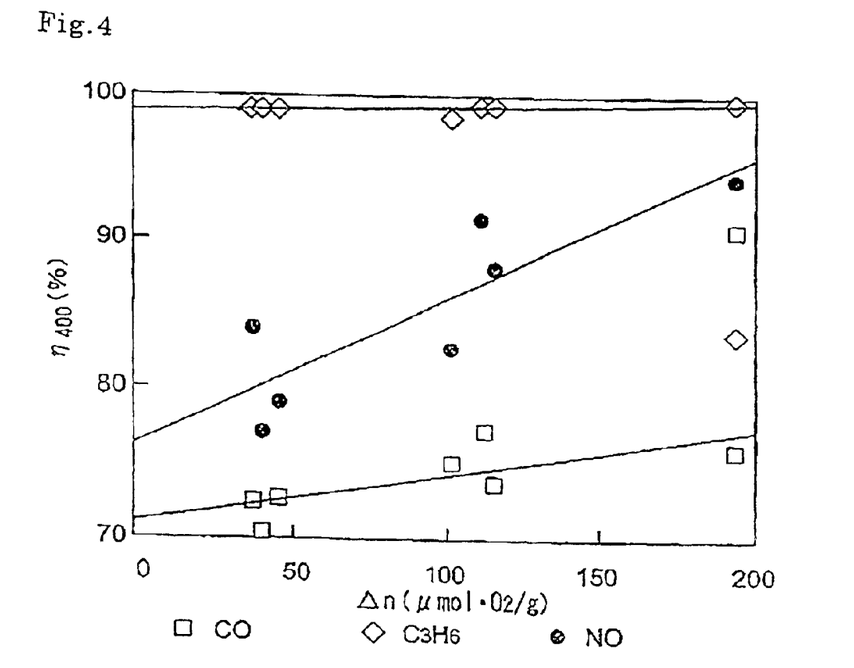
FIG. 4 is a graph showing a relation between an oxygen storage capacity ($\Delta n$) and each of cut-down rates ($\eta_{400}$) of carbon monoxide, propylene gas and nitrogen oxides.

As apparent from the data shown in FIG. 4, the co-catalysts had the specific surface areas of 40 m²/g or more in the range of the weight ratio of the cerium oxide and the zirconium oxide between (2:1) and (1:5) (Examples 7 to 9). On the other hand, when the boehmite was used (Comparative Examples 14 and 15) and the zirconium was not contained (Comparative Examples 12 and 13), the specific surface areas after the higher temperature treatment were unsatisfactorily below 20 m²/g. However, it can be understood that the specific surface areas of the co-catalysts can be easily adjusted over 40 m²/g by the specific surface areas of the γ-alumina because the specific surface areas after the higher temperature treatment, when the weight ratio of the cerium with respect to the zirconium exceeded 2.5 (Comparative Examples 9 to 11), exhibited 38, 39 and 30 m²/g close to 40 m²/g.

EXAMPLE 10

Figure 1:
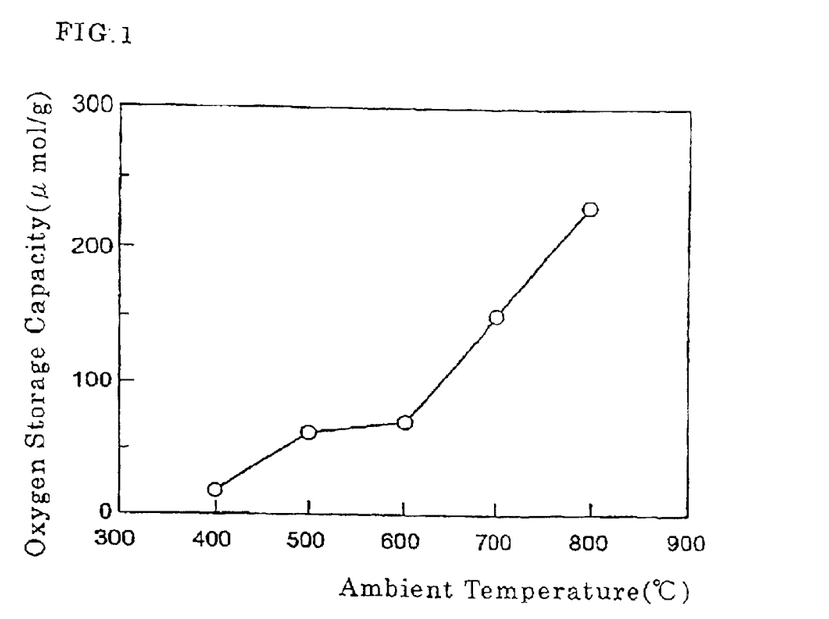
FIG. 1 is a graph showing a relation between an ambient temperature and an oxygen storage capacity in Example 10.

Oxygen storage capacities at 400, 500, 600, 700 and 800° C. of the co-catalyst after the higher temperature treatment prepared in Example 1 were measured. The results were shown in FIG. 1 with —○—. The graph shows that while the oxygen storage capacity increased up to 600° C. though it was 80 μmols/g or less, it rapidly increased at 600 to 700° C. and nearly doubled at 700° C. to be 150 μmols/g. The oxygen storage capacity further increased with the temperature and reached to 240 μmols/g at 800° C.

EXAMPLE 11

A larger number of catalysts sintered at 1000° C. for three hours were prepared in accordance with the procedures of Example 1 except that raw material aluminum oxides having a different specific area were used and platinum was used in place of the palladium.

After a honey-comb support made of cordierite (diameter: 25.4 cm, length: 50 cm) supporting each of the catalysts was mounted in a reaction apparatus having an ordinary-pressure fixed bed, a phantom exhaust gas was supplied thereto at SV (space velocity)=60000/hour, and a temperature on which the carbon monoxide concentration reduced to half ($T_{50}$) was measured while the temperature in the apparatus was increased at a rising rate of 20° C./minute. The $T_{50}$s of seven catalysts in all were measured, and relations between the specific surface area and the $T_{50}$(CO) for each of the catalysts were shown in FIG. 2 with —■—.

Figure 2:
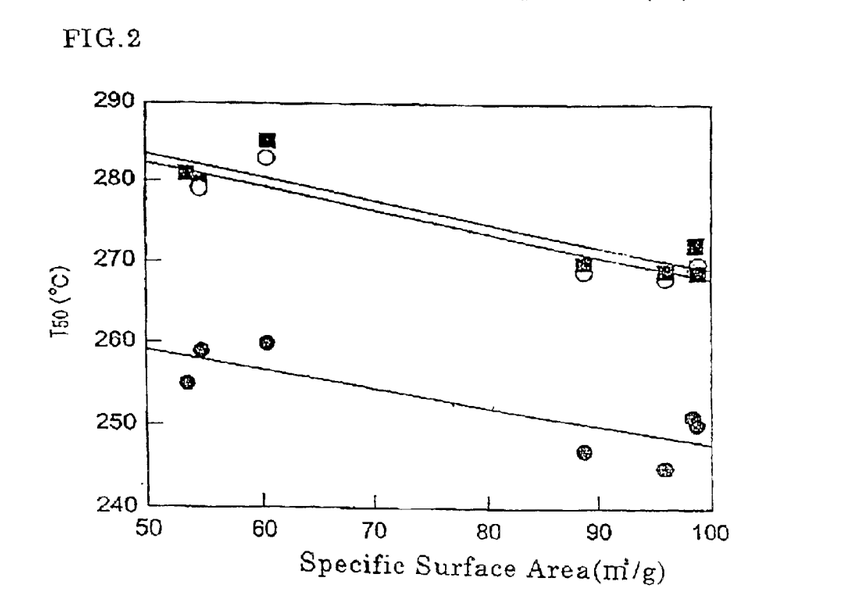
FIG. 2 is a graph showing a relation between the specific surface area of a catalyst and the 50 percent reduction temperature ($T_{50}$) of carbon monoxide in Example 11.

After the regeneration of the seven catalysts, the $T_{50}$s were similarly measured by using propylene gas in place of the carbon monoxide, and relations between the specific surface area and the $T_{50}(C_3H_6)$ for each of the catalysts were shown in FIG. 2 with —◯—.

After the regeneration of the seven catalysts, the $T_{50}$s were similarly measured by using nitrogen oxides in place of the propylene gas, and relations between the specific surface area and the $T_{50}$(NOx) for each of the catalysts were shown in FIG. 2 with —●—.

The graph of FIG. 2 showed that the $T_{50}$ reduced with the increase of the specific surface area, and in other words, the decomposition of the polluted substance proceeded at milder conditions.

EXAMPLE 12

Ten precious metal catalysts containing a co-catalyst similar to that of Example 1 were prepared by selecting the aluminum oxide such that an oxygen storage capacity (Δn) was about 50 μmols/g. Similarly, another ten precious metal catalysts containing a co-catalyst similar to that of Example 1 were prepared by selecting the aluminum oxide such that an oxygen storage capacity (Δn) was about 100 μmols/g. Furthermore, further three precious metal catalysts containing a co-catalyst similar to that of Example 1 were prepared by selecting the aluminum oxide such that an oxygen storage capacity (Δn) was about 200 μmols/g. The supported metal of the precious metal catalyst was rhodium, platinum or rhodium/platinum.

Cut-down rates ($\eta_{400}$) of nitrogen oxides attained by each of the catalysts were measured by using the apparatus of Example 11 having these precious metal catalysts and a fixed temperature of 400° C. and treating nitrogen oxides as a specimen. Relations between the oxygen storage capacities (Δn) of each of the catalysts and the ←$_{400}$ were shown in FIG. 3 (wherein that of the rhodium used as the precious metal in each of the catalysts was indicated with —□—, that of the platinum was indicated with —◇—and that of the platinum/rhodium was indicated with —○—.

Figure 3:
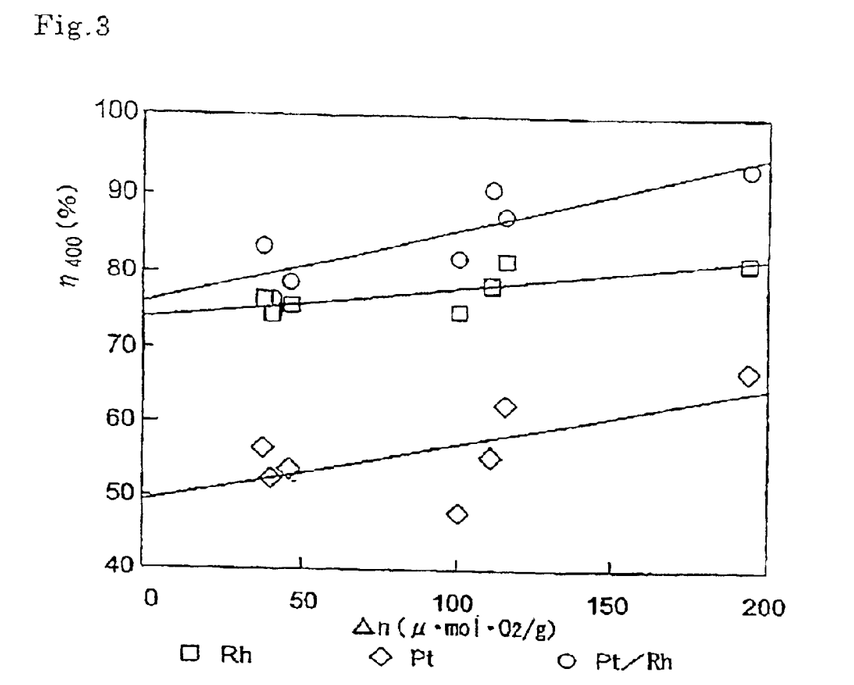
FIG. 3 is a graph showing a relation between an oxygen storage capacity ($\Delta n$) and a cut-down rate ($\eta_{400}$) of nitrogen oxides in Example 12.

As shown in the drawings, the decomposition efficiency of the nitrogen oxides increased with the increase of the oxygen storage capacity.

EXAMPLE 13

Relations between oxygen storage capacities (Δn) and cut-down rates (←$_{400}$) were investigated by measuring the cut-down rates (←$_{400}$) of the carbon monoxide (—□—), of the propylene gas (—◇—), and of the nitrogen oxides (—●—) at 400° C. by means of employing the lager number of the catalysts (the precious metal was platinum/rhodium) having the same oxygen storage capacity as that of the catalysts prepared in Example 12. The results were shown in a graph of FIG. 4.

As shown in the graph of FIG. 4, the cut-down rate of nearly 100% was achieved with respect to the propylene gas regardless of the oxygen storage capacity, and the cut-down rates of the nitrogen oxides and the carbon monoxide increased with the increase of the oxygen storage capacity.

EXAMPLE 14

After seven co-catalysts having a composition of cerium oxide, zirconium oxide and aluminum oxide having properties of Table 5, and three co-catalysts having a composition of cerium oxide, zirconium oxide, aluminum oxide and oxides of a rare-earth metal having properties of Table 6 were prepared, specific surface areas sintered at 620° C. and 1000° C. for three hours (m²/g) and oxygen storage capacities (Δn, μmol-$O_2$/g) at the respective temperatures of each of the co-catalysts were measured. After precious metal catalysts having platinum and rhodium in a molar ratio of 3:1 were added to the co-catalysts to prepare catalysts for purifying an exhaust gas, $T_{50}$ (° C.) and $\eta_{400}$ (%) with respect to carbon monoxide, hydrocarbons and nitrogen oxides were measured. The results were shown in Tables 5 and 6. Peak area in the Tables are a peak area ratio of power X-ray diffraction of ceria and zirconia.

TABLE 5

| Specimen No. | Y11 | Y12 | Y13 | Y14 | Y15 | Y16 | Y17 |
|---|---|---|---|---|---|---|---|
| $ZrO_2$ Peak Area Ratio | 1.000 | 0.877 | 0.562 | 0.792 | 0.307 | 0.530 | 1.000 |
| $CeO_2$ Peak Area Ratio | 0.000 | 0.123 | 0.438 | 0.208 | 0.693 | 0.470 | 0.000 |
| Weight % | | | | | | | |
| $CeO_2$ | 15 | 25 | 35 | 6 | 14 | 10 | 10 |
| $ZrO_2$ | 35 | 25 | 15 | 14 | 6 | 10 | 20 |
| $Al_2O_3$ | 50 | 50 | 50 | 80 | 80 | 80 | 70 |
| Specific Surface Area ($m^2/g$) | | | | | | | |
| 620° C. × 3 h | 95.4 | 102.7 | 109.3 | 134.5 | 140.3 | 131.9 | 122.8 |
| 1000° C. × 3 h | 59.5 | 64.9 | 61.3 | 94.2 | 93.9 | 92.9 | 87.1 |
| Oxygen Storing Ability $\mu molO_2/g$ | | | | | | | |
| 400° C. | 30.8 | 9.4 | 0.0 | 19.1 | 0.0 | 7.8 | 27.0 |
| 500° C. | 40.1 | 23.0 | 8.0 | 33.2 | 0.0 | 15.2 | 32.5 |
| 600° C. | 47.8 | 67.7 | 2.9 | 34.7 | 10.1 | 18.2 | 72.7 |
| 700° C. | 111.7 | 194.3 | 116.0 | 40.4 | 37.3 | 45.9 | 109.4 |
| 800° C. | 263.5 | 277.1 | 144.4 | 56.8 | 26.1 | 77.3 | 101.1 |
| $T_{50}$ (° C.) | | | | | | | |
| CO | 281 | 285 | 280 | 269 | 269 | 272 | 270 |
| HC | 281 | 283 | 279 | 269 | 268 | 270 | 269 |
| NOx | 255 | 260 | 259 | 250 | 245 | 251 | 247 |
| $\eta_{400}$ (%) | | | | | | | |
| CO | 77.0 | 75.6 | 73.5 | 70.2 | 72.4 | 72.2 | 74.8 |
| HC | 99.2 | 99.6 | 99.2 | 99.2 | 99.3 | 99.0 | 98.5 |
| NOx | 91.3 | 94.0 | 88.0 | 76.8 | 78.8 | 83.7 | 82.4 |

TABLE 6

| Specimen No. | Y18 | Y19 | Y20 |
|---|---|---|---|
| $ZrO_2$ Peak Area Ratio | 1.000 | 1.000 | 1.000 |
| $CeO_2$ Peak Area Ratio | 0.000 | 0.000 | 0.000 |
| Weight % | | | |
| $CeO_2$ | 31.4 | 31.4 | 31.4 |
| $ZrO_2$ | 33.3 | 33.3 | 33.3 |
| $Al_2O_3$ | 33.3 | 33.3 | 33.3 |
| Rare Earth Element | 2.0 ($La_2O_3$) | 2.0 ($Pr_2O_3$) | 2.0 ($Gd_2O_5$) |
| Specific Surface Area ($m^2/g$) | | | |
| 620° C. × 3 h | 89.1 | 90.0 | 89.6 |
| 1000° C. × 3 h | 49.6 | 50.4 | 49.7 |
| Oxygen Storing Ability $\mu molO_2/g$ | | | |
| 400° C. | 30.8 | 30.4 | 32.3 |
| 500° C. | 118.3 | 119.5 | 120.5 |
| 600° C. | 132.6 | 135.4 | 134.5 |
| 700° C. | 287.8 | 288.4 | 287.8 |
| 800° C. | 443.1 | 450.2 | 440.5 |
| $T_{50}$ (° C.) | | | |
| CO | 296 | 290 | 294 |
| HC | 295 | 290 | 292 |
| NOx | 266 | 260 | 263 |
| $\eta_{400}$ (%) | | | |
| CO | 72.2 | 72.5 | 72.4 |
| HC | 99.6 | 99.7 | 99.7 |
| NOx | 88.1 | 88.3 | 88.2 |

INDUSTRIAL APPLICABILITY

The present invention is a co-catalyst for purifying an exhaust gas including: a composite oxide including (a) cerium; and (b) at least one element selected from the group consisting of zirconium, yttrium, strontium, barium and a rare-earth element supported on a particulate aluminum oxide support; a specific surface area of the co-catalyst after sintering being not less than 40 $m^2/g$; an oxygen storage capacity at 400° C. being not less than 10 $\mu$mols/g and an oxygen storage capacity at 700° C. being not less than 100 $\mu$mols/g (Claim 1).

Since the cerium oxide which complements the catalysis of the precious metal catalyst usable together forms the composite oxide together with the added element, the cerium does not liberate and is protected by the added element having the resistance to heat even after the sintering at a relatively higher temperature, and the activity thereof is seldom reduced for a longer period of time.

Since the specific surface area and the oxygen storage capacity are maintained at specified values or more even after the higher temperature sintering which has conflicting effects of the attribution to the elevation of the resistance to heat and the reduction of the specific surface area, the advantage of the higher temperature sintering exceeds the disadvantage of the activity reduction caused by the higher temperature sintering, and the catalyst can be used for a longer period of time with little deterioration in the internal combustion engine such as in an automobile in which a temperature of an exhaust gas may reach to a higher temperature up to 1000° C. or more.

Preferable sintering conditions for providing the resistance to heat to the catalyst, especially for obtaining the catalyst having the resistance to heat against the higher-temperature exhaust gas practically discharged from the automobile includes the sintering between 800 and 1100° C. (Claim 2), and the co-catalyst prepared in accordance with such severe sintering conditions and having the specific surface area after the sintering of not less than 40 $m_2/g$ and the oxygen storage capacity at 400° C. of not less than 10 $\mu$mols/g and the oxygen storage capacity at 700° C. of not less than 100 μmols/g, is seldom deteriorated when mounted in the automobile for purifying the exhaust gas of which a composition ratio changes drastically.

When the catalyst for purifying the exhaust gas is formed by the precious metal and the above co-catalyst (Claim 3) and the exhaust gas containing carbon monoxide, hydrocarbons and nitrogen oxides at a temperature of 400° C. or more, the oxygen storage capacity of the cerium oxide of the co-catalyst significantly increases at a temperature between 600° C. and 700° C. and, especially the activity of the cerium oxide is utilized at maximum in a reaction at 700° C. or more.

What is claimed is:

1. A co-catalyst for purifying an exhaust gas comprising:

a composite oxide including (a) cerium; and (b) at least one element selected from the group consisting of zirconium, yttrium, strontium, barium and a rare-earth element supported on a particulate aluminum oxide support;

wherein a specific surface area of the co-catalyst after sintering is not less than 40 m$^2$/g, an oxygen storage capacity at 400° C. is not less than 10 μmols/g, and an oxygen storage capacity at 700° C. is not less than 100 μmols/g.

2. The co-catalyst for purifying the exhaust gas as defined in claim 1, wherein sintering is conducted at a temperature condition between 800 and 1100° C.

3. A catalyst for purifying an exhaust gas comprising:

a precious metal catalyst; and a co-catalyst for purifying an exhaust gas comprising a composite oxide including (a) cerium; and (b) at least one element selected from the group consisting of zirconium, yttrium, strontium, barium and a rare-earth element supported on a particulate aluminum oxide support;

where a specific surface area of the co-catalyst after sintering is not less than 40 m$^2$/g, an oxygen storage capacity at 400° C. is not less than 10 μmols/g, and an oxygen storage capacity at 700° C. is not less than 100 μmols/g.

* * * * *